United States Patent
Koch et al.

[11] Patent Number: 6,166,155
[45] Date of Patent: Dec. 26, 2000

[54] PROCESS FOR PREPARING POLYMERS OF VINYL MONOMERS WITH NARROW MOLECULAR WEIGHT DISTRIBUTION BY CONTROLLED FREE-RADICAL POLYMERIZATION

[75] Inventors: Jürgen Koch, Neuhofen; Michael Fischer, Ludwigshafen; Klaus Muellen, Köln; Markus Klapper, Mainz, all of Germany; Nicholas Benfaremo, Wappinger Falls, N.Y.; Wiebke Wunderlich, Mainz; Wolfgang Paulus, Weisenheim, both of Germany

[73] Assignees: BASF Aktiengesellschaft; Max Planck Gesellschaft zur Forderung der Uissenschaften

[21] Appl. No.: 08/945,532
[22] PCT Filed: May 8, 1996
[86] PCT No.: PCT/EP96/01924
§ 371 Date: Oct. 28, 1997
§ 102(e) Date: Oct. 28, 1997
[87] PCT Pub. No.: WO96/35727
PCT Pub. Date: Nov. 14, 1996

[30] Foreign Application Priority Data

May 12, 1995 [DE] Germany .................. 195 16 967

[51] Int. Cl.$^7$ .................. C08F 2/06; C08F 2/02
[52] U.S. Cl. .................. 526/204; 526/205; 526/209
[58] Field of Search .................. 526/204, 201, 526/205, 209, 222

[56] References Cited

U.S. PATENT DOCUMENTS

| | | | |
|---|---|---|---|
| 3,207,815 | 9/1965 | Joo et al. | |
| 4,538,252 | 8/1985 | Aviram | 430/270 |
| 5,285,002 | 2/1994 | Grootaert | 526/222 |
| 5,322,912 | 6/1994 | Georges. | |
| 5,739,229 | 4/1998 | Keoshkerian et al. | 526/215 |

FOREIGN PATENT DOCUMENTS

| | | |
|---|---|---|
| 0073304 | 9/1983 | European Pat. Off. |
| 94 11412 | 5/1994 | WIPO. |

*Primary Examiner*—Christopher Henderson
*Attorney, Agent, or Firm*—Keil & Weinkauf

[57] ABSTRACT

Processes for preparing polymers of vinylic monomers where polymerization is conducted in the presence of free-radical initiators and electron donors.

20 Claims, 1 Drawing Sheet

PROCESS FOR PREPARING POLYMERS OF VINYL MONOMERS WITH NARROW MOLECULAR WEIGHT DISTRIBUTION BY CONTROLLED FREE-RADICAL POLYMERIZATION

The present invention relates to processes for preparing polymers of vinylic monomers.

The present invention also relates to the use of the polymers obtainable in such processes for preparing moldings.

BACKGROUND OF THE INVENTION

Free-radical polymerization is the most widely applicable technique for polymerizing vinylic monomers. It permits the polymerization of a multiplicity of monomers varying in structure, functional groups and polarity. The copolymerization of different monomers with one another is also possible. Owing to unavoidable side reactions such as chain transfer, disproportionation, recombination or elimination, however, it is very difficult to control the molecular weight distribution. Normally, polymers having a polydispersity index PDI of 2.0 or more are obtained. PDI is defined as $$PDI = \frac{M_w}{M_n}$$

where $M_w$ is the weight-average and Mn the number-average molecular weight.

A process which has long been known for preparing polymers with a narrow molecular weight distribution is that of anionic polymerization. However, it is only useful with a limited number of monomers. Apolar monomers, such as styrene or butadiene, can be polymerized anionically. In the case of polar monomers, such as n-alkyl acrylates, for example, anionic polymerization is very difficult. Moreover, anionic polymerization requires highly pure monomers and solvents, and the complete exclusion of atmospheric humidity.

Another method of preparing polymers of narrow molecular weight distribution is that of controlled free-radical polymerization, sometimes also called "living" free-radical polymerization, which is described, for example, in M. K. Georges et al., Trends in Polymer Science, Vol. 2, No. 2 (1994), pages 66 to 72. The fundamental strategy of this method consists in temporarily blocking and then reactivating, in a controlled manner, the reactive free-radical chain ends of a growing polymer chain. The dynamic equilibrium between active and dormant form leads to a low steady-state concentration of free polymer radicals.

A variety of techniques are available for blocking and stabilizing the free-radical chain end. They employ stable free radicals and/or metal salts.

For instance, it is known to use "iniferters", i.e. free-radical generators which both free-radically initiate a polymerization and terminate the chain end by combination. Examples of photochemically activated iniferters, such as dithiocarbamates, are described in T. Otsu et al., Eur. Polym. J., Vol. 25, No. 7/8 (1989), pages 643 to 650. These photochemical iniferters, however, are very expensive compounds, and photochemically initiated polymerization is highly uneconomic in industrial practice. Furthermore, the polydispersity index is very high in some cases. There are also thermal iniferters, such as tetramethylene disulfides, which are described, for example, in K. Endo et al., Macromolecules, Vol. 25 (1992), pages 5554 to 5556. In this case the PDI, at levels of between 3 and 4, is too high to be satisfactory.

EP-A 135 280 describes the use of stable N-oxyl radicals, which combine reversibly with the reactive chain ends. However, this process produces not high molecular mass-polymers but only oligomers instead.

U.S. Pat. No. 5,322,912 discloses cyclic, sterically shielded N-oxyl radicals which are used in combination with conventional initiators. These systems, however, do not permit the polymerization of alkyl acrylates.

EP-A 489 370 describes free-radically initiated addition polymerization in the presence of alkyl iodides. Here too, the molecular weights are at an unsatisfactorily low level.

The same disadvantage is shown by the products described in EP-A 222 619, which are prepared with the aid of bimetallic catalysts containing cyclopentadienyl ligands.

All methods known to date have the disadvantage that the additives used to control the reaction are very expensive and the processes are therefore uneconomic.

DETAILED DESCRIPTION OF THE INVENTION

It is an object of the present invention, therefore, to provide new processes for preparing polymers of vinylic monomers, which processes do not have the abovementioned disadvantages, can be applied to polar and apolar monomers, permit control of the molecular weight and of the molecular weight distribution, and are insensitive to small amounts of moisture.

We have found that this object is achieved by processes for preparing polymers of vinylic monomers, where polymerization is carried out in the presence of free-radical initiators and electron donors.

We have also found that the polymers obtainable in such processes can be used to prepare moldings.

Figure 1:
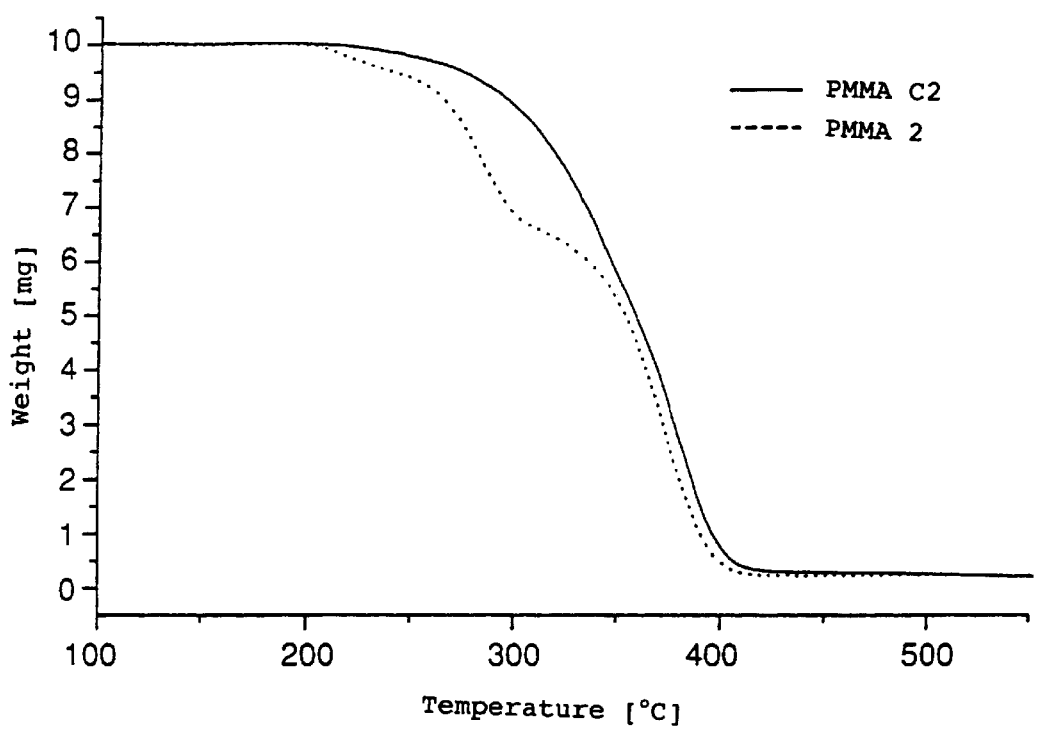
FIG. 1 is a graph showing TGA (Thermograph Analysis) curves for the poly(methyl methacrylate) of Example 2, below, and comparison Example 2C, below.

Particularly suitable vinylic monomers are vinylaromatic compounds such as styrene, 2-vinylnaphthalene and 9-vinylanthracene, substituted vinylaromatic compounds such as p-methylstyrene, a-methylstyrene, p-chlorostyrene, 2,4-dimethylstyrene and 4-vinylbiphenyl, $C_1$- to $C_8$-alkyl esters of acrylic or methacrylic acid, especially $C_1$- to $C_4$-acrylates and methacrylates, unsaturated dicarboxylic acids, for example aliphatic unsaturated dicarboxylic acids such as maleic or fumaric acid, or derivatives thereof such as anhydrides, esters and amides, especially anhydrides, such as maleic anhydride, or vinyl cyanides, especially acrylonitrile. Mixtures of different monomers can likewise be employed.

Preferred monomers are styrene, substituted styrenes, $C_1$- to $C_4$-acrylates and methacrylates, especially methyl methacrylate, and acrylonitrile.

The free-radical initiators employed in the novel process are known per se and are described, for example, in Ullmanns Encyclopadie der technischen Chemie, 4th edition, Volume 15, page 187. Particularly suitable initiators are peroxides, such as dibenzoyl peroxide and cumene hydroperoxide, and especially diazo compounds, such as azodiisobutyronitrile (AIBN). It is also possible to employ mixtures of different free-radical initiators. the molar amount of free-radical initiator can be from $10^{-6}$ to 1 mol/l, preferably from $10^{-4}$ to $10^{-1}$ mol/l.

The novel process is also carried out in the presence of electron donors.

Electron donors are molecules which owing to mesomeric and/or inductive effects have an excess of π-electrons.

Examples of electron donors are compounds of the formula I or II

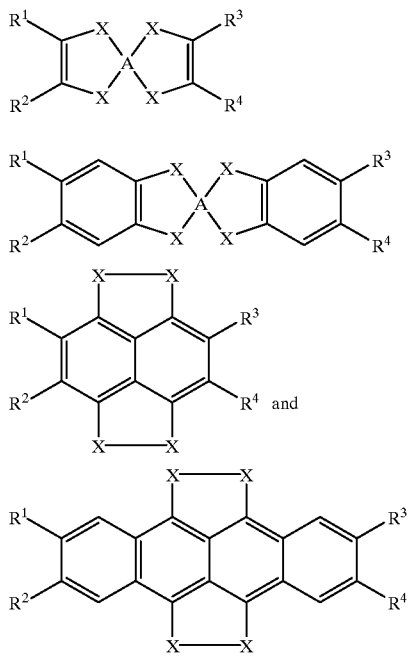

where

X is sulfur or selenium, $R^1$ to $R^4$ are hydrogen, $C_1$- to $C_{20}$-alkyl, preferably $C_1$- to $C_6$-alkyl, $C_1$- to $C_{20}$-alkoxy, preferably $C_1$- to $C_6$-alkoxy or $C_6$- to $C_{18}$-aryl, preferably phenyl and A is a double bond,

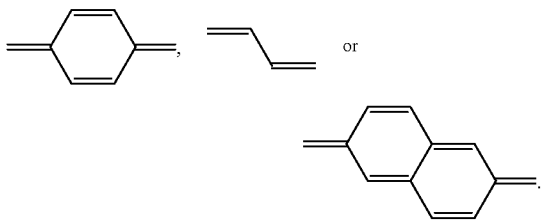

Preference is given to compounds of the formula I or II where $R^1$ and $R^2$ are identical and also $R^3$ and $R^4$, or to those in which $R^1$ and $R^3$ are identical and also $R^2$ and $R^4$, i.e. symmetrical compounds. Preferably X is sulfur and $R^1$ to $R^4$ are hydrogen or methyl. A particularly preferred compound is tetrathiafulvalene (TTF)

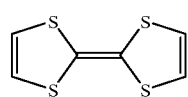

Further examples of electron donors are

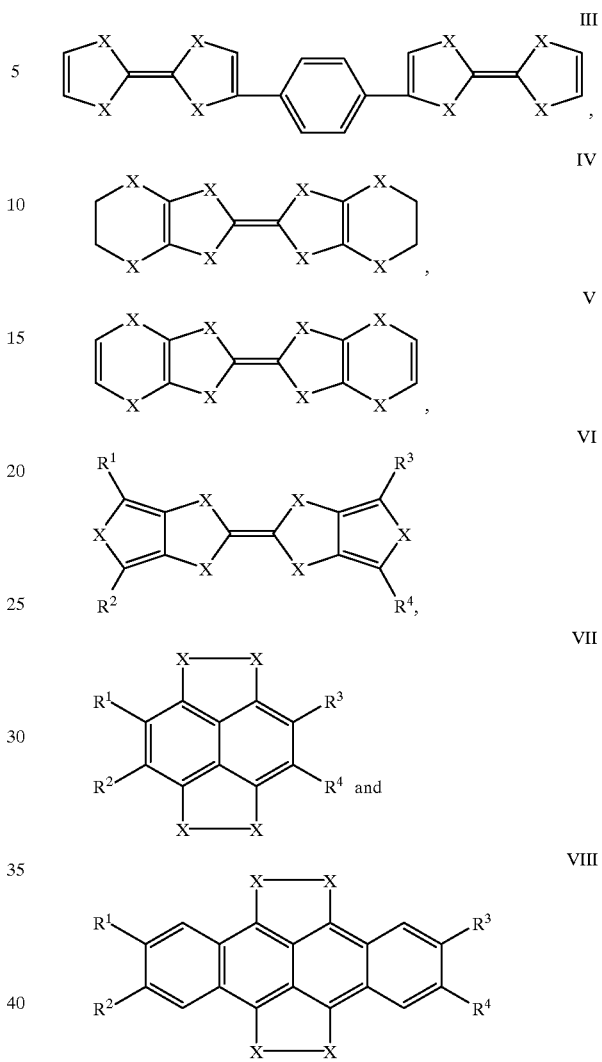

where

X is sulfur or selenium and $R^1$ to $R^4$ are hydrogen, $C_1$- to $C_{20}$-alkyl, preferably $C_1$- to $C_6$-alkyl, $C_1$- to $C_{20}$-alkoxy, preferably $C_1$- to $C_6$-alkoxy or $C_6$- to $C_{18}$-aryl, preferably phenyl.

Here again, preference is given to the symmetrical compounds, i.e. to those in which either $R^1$ and $R^2$ and also $R^3$ and $R^4$ are identical or $R^1$ and $R^3$ and also $R^2$ and $R^4$. Here again, preferably, X is sulfur and $R^1$ to $R^4$ are hydrogen or methyl.

Other electron donors which can be employed are compounds of the formula IX or X

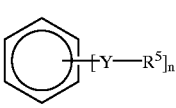

where

Y is oxygen or sulfur,

R$^5$ is C$_1$- to C$_{20}$-alkyl, preferably C$_1$- to C$_6$-alkyl, C$_1$- to C$_{20}$-alkoxy, preferably C$_1$- to C$_6$-alkoxy or C$_6$- to C$_{18}$-aryl, preferably phenyl, and n is an integer from 2 to 6.

Likewise suitable are phenoxazines, phenothiazine derivatives or phenoselenazines.

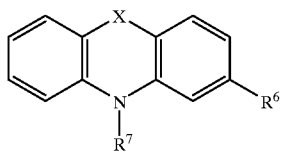

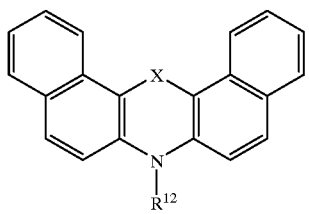

where

X is oxygen, sulfur or selenium, preferably sulfur, and

R$^6$ is hydrogen, C$_1$- to C$_5$-alkyl, preferably methyl or ethyl, —CF$_3$, halogen, preferably —Cl, —CN, —SR$^a$, —OR$^a$ or —NR$^a$R$^b$, R$^a$ is C$_1$- to C$_{25}$-alkyl, preferably C$_1$- to C$_{22}$-alkyl, especially C$_1$- to C$_{10}$-alkyl, for example methyl, ethyl, n-propyl, isopropyl, n-butyl, isobutyl or t-butyl, or C$_6$- to C$_{18}$-aryl, preferably phenyl, R$^b$ is hydrogen, C$_1$- to C$_{25}$-alkyl, preferably C$_1$- to C$_{22}$-alkyl, especially C$_1$- to C$_{10}$-alkyl, for example methyl, ethyl, n-propyl, isopropyl, n-butyl, isobutyl or t-butyl, C$_6$- to C$_{18}$-aryl, preferably phenyl, R$^7$ is hydrogen or —(T)—Z, T is branched or unbranched C$_1$- to C$_{25}$-alkylene, preferably C$_1$- to C$_{22}$-alkylene and, with particular preference, C$_1$- to C$_{10}$-alkylene, for example methylene, ethylene, 2-methylethylene, n-propylene or n-butylene, Z is —OH, —OR$^8$, —SR$^8$, —NR$^9$R$^{10}$ or Q, among which —NR$^9$R$^{10}$ or Q is preferred, R$^8$ is C$_1$- to C$_{25}$-alkyl, preferably C$_1$- to C$_{22}$-alkyl, especially C$_1$- to C$_{10}$-alkyl, for example methyl, ethyl, n-propyl, isopropyl, n-butyl, isobutyl or t-butyl, or C$_6$- to C$_{18}$-aryl, preferably phenyl, R$^9$ is hydrogen or C$_1$- to C$_{25}$-alkyl, preferably C$_1$- to C$_{22}$-alkyl, especially C$_1$- to C$_{10}$-alkyl, for example methyl, ethyl, n-propyl, isopropyl, n-butyl, isobutyl or t-butyl, or C$_6$- to C$_{18}$-aryl, preferably phenyl, R$^{10}$ is C$_1$- to C$_{25}$-alkyl, preferably C$_1$- to C$_{22}$-alkyl, especially C$_1$- to C$_{10}$-alkyl, for example methyl, ethyl, n-propyl, isopropyl, n-butyl, isobutyl or t-butyl, or C$_6$- to C$_{18}$-aryl, preferably phenyl, where R$^9$ and R$^{10}$, with one another and together with the nitrogen, can form a C$_4$- to C$_7$-cyclo-N-aliphatic ring, preferably a C$_5$-cyclo-N-aliphatic or a C$_6$-cyclo-N-aliphatic ring, which can be either unsubstituted or substituted by one or more C$_1$- to C$_5$-alkyls, preferably methyl, ethyl, n-propyl or isopropyl, and which can contain one or more, preferably one, —O—, —S— or —N(R$^{11}$)—, the latter being preferred, where —O—, —S— and —N(R$^{11}$)— are not joined directly to one another, Q is a C$_4$- to C$_7$-cycloaliphatic radical, preferably a C$_5$- or C$_6$-cycloaliphatic ring, which can contain one or more —O—, —S— or —N(R$^{11}$)—, the latter being preferred, and where Q is in each case linked via a carbon to T and where —O—, —S— and —N(R$^{11}$) are not joined directly to one another, R$^{11}$ is C$_1$- to C$_{10}$-alkyl, preferably C$_1$- to C$_5$-alkyl, for example methyl, ethyl, n-propyl, isopropyl, n-butyl, isobutyl or t-butyl, R$^{12}$ is hydrogen, C$_1$- to C$_{20}$-alkyl, preferably C$_1$- to C$_6$-alkyl or C$_6$- to C$_{18}$-aryl, preferably phenyl.

Preferred phenothiazines include:

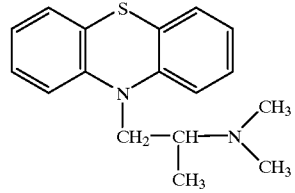

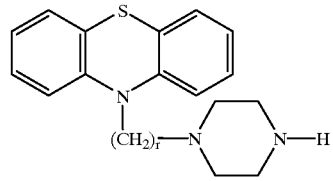

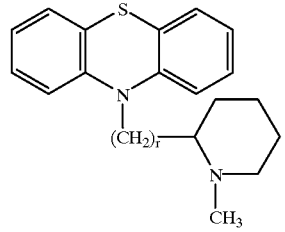

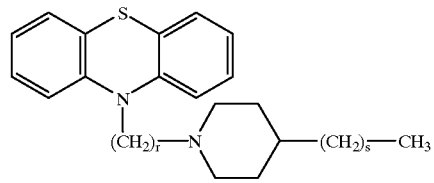

in each of which r is an integer from 2 to 11 and s is an integer from 1 to 4.

Further suitable electron donors are the following compounds:

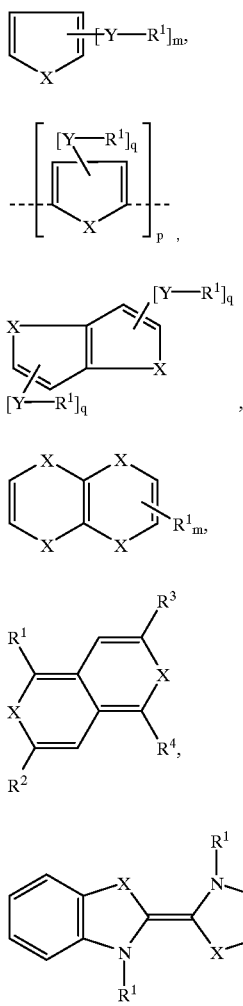

where
- X is sulfur or selenium, preferably sulfur
- Y is oxygen or sulfur
- $R^1$ to $R^4$ are hydrogen, $C_1$- to $C_{20}$-alkyl, preferably $C_1$- to $C_6$-alkyl or $C_6$- to $C_{18}$-aryl, preferably phenyl
- m is an integer from 0 to 4
- q is an integer from 0 to 2 and
- p is an integer from 2 to 100.

It is also possible to employ mixtures of different electron donors.

The compounds employed as electron donors are known per se or can be prepared by processes which are known per se and are described, for example, in J. H. Perlstein, Angew. Chem. Int. Ed. Engl. 16 (1977), pages 519 to 534 and M. R. Bryce, Aldrichimica Acta, Vol. 18 (1985), pages 73 to 77.

The molar ratio of electron donors to free-radical initiators can be in the range from 1:1 to 3:1, preferably from 1.6:1 to 2.4:1.

The conditions for the reaction are not critical; it can be carried out at from 0 to 220° C., preferably from 20 to 150° C., normally under atmospheric pressure, although it is also possible to operate at pressures up to 30 bar. The chosen reaction times are preferably such that polymerization is carried out until the desired molecular weight is reached, for example from 1 hour to 6 days.

The novel process can also be carried out in the presence of an organic solvent. Examples of suitable solvents are tetrahydrofuran (THF), toluene and ethylbenzene or mixtures thereof.

The novel process is preferably conducted by charging the free-radical initiator and the electron donor to the reactor and adding the monomer or monomers and, if used, the solvent. However, it is also possible to reverse the addition sequence. The polymers can be worked up by precipitation, for example from methanol or hexane.

The molecular weights Mn of the resulting polymers can vary within wide ranges, for example from 5000 to 500,000.

Particular features of the novel process are its economy: both polar and apolar monomers can be employed; its insensitivity to small amounts of moisture, and the possibility of reacting mixtures of monomers to give random copolymers. The resulting polymers have a PDI of less than 2, may have a high molecular weight, and exhibit relatively high thermal stability.

EXAMPLES

Examples 1 to 6

Preparing Polymethyl Methacrylate (PMMA)

Methyl methacrylate (MMA) was distilled over calcium hydride. THF and toluene were distilled over potassium and sodium, respectively. AIBN was recrystallized from methanol. Commercially available TTF was employed without additional purification.

The concentration of the monomers was 4.8 mol per liter of solvent. The free-radical initiator was employed in an amount of $2.4 \times 10^{-2}$ mol/l and the electron donor in an amount of $4.8 \times 10^{-2}$ mol/l. The polymerization reactions were conducted in a 50 ml Schlenk tube under argon. The monomer and the solvent were injected with a needle, through a septum, into the initial charge of free-radical initiator and electron donor in the argon-flushed Schlenk tube.

The polymer was worked up by precipitating the polymer solution, diluted with THF, from ten times the volume of methanol. The polymers prepared in toluene were precipitated from n-hexane.

The molecular weights were determined by GPC (gel permeation chromatography), with calibration using PMMA standards.

Comparison Examples C1 to C4

Preparing PMMA

Examples 1 to 6 were repeated but without adding TTF.

The reaction conditions and the properties of the polymethyl methacrylates are summarized in Table 1.

The thermal stability can be determined by thermogravimetric analysis (TGA). It was found that the temperature at which loss of mass begins is at markedly higher levels in the case of PMMA prepared by the novel process.

FIG. 1 shows the TGA curves of the PMMA from Example 2 and of the PMMA from Comparison Example C2, ($N_2$ atmosphere, heating rate 10 K/min).

Examples 12 to 14

Preparing Polystyrene and Styrene-Acrylonitrile Copolymers Using Phenothiazines as Electron Donor Examples 1 to 6 were repeated but using commercially available phenothiazine (V, $R^6$, $R^7$=H) (PTA) and dimethylaminopropylphenothiazine (V, $R^6$=H, $R^7$=—$CH_2$—CH($CH_3$)—N($CH_3$)$_2$) (DMAPPTA) as electron donors. The

TABLE 1

| Experiment No. | Monomer | Free-radical initiator | Electron donor | Solvent | Temp. [° C.] | Reaction time | Mn | Mw | PDI |
| --- | --- | --- | --- | --- | --- | --- | --- | --- | --- |
| 1 | MMA | AIBN | TTF | THF | 60 | 72 h | 21 500 | 31 800 | 1.48 |
| 2 | MMA | AIBN | TTF | THF | 60 | 72 h | 31 500 | 46 000 | 1.46 |
| 3 | MMA | AIBN | TTF | THF | 60 | 72 h | 32 300 | 50 100 | 1.54 |
| 4 | MMA | AIBN | TTF | THF | 60 | 72 h | 31 500 | 48 400 | 1.53 |
| 5 | MMA | AIBN | TTF | Toluene | 110 | 72 h | 19 000 | 26 000 | 1.38 |
| 6 | MMA | AIBN | TTF | Toluene | 110 | 72 h | 14 400 | 19 700 | 1.37 |
| C1 | MMA | AIBN | — | THF | 60 | 24 h | 51 300 | 103 100 | 2.01 |
| C2 | MMA | AIBN | — | THF | 60 | 24 h | 34 000 | 70 000 | 2.06 |
| C3 | MMA | AIBN | — | Toluene | 110 | 24 h | 7 700 | 35 800 | 4.65 |
| C4 | MMA | AIBN | — | Toluene | 110 | 24 h | 5 600 | 28 500 | 5.03 |

Examples 7 to 10

Preparing Polystyrene

Examples 1 to 6 were repeated but using styrene as monomer instead of MMA.

Comparison Examples C5 to C8

Preparing Polystyrene

Examples 7 to 10 were repeated but without adding TTF.

The reaction conditions and the properties of the polystyrenes are summarized in Table 2.

monomers used were styrene and, respectively, a mixture of styrene and acrylonitrile (AN) (weight ratio 3:1). Commercially available benzoyl peroxide, which was employed without additional purification, served as the free-radical initiator. The benzoyl peroxide and the electron donor were employed in equimolar amounts. The concentration of the benzoyl peroxide relative to monomer was 0.1 mol %.

The reaction conditions and the properties of the resulting polymers and copolymers are given in Table 4.

TABLE 2

| Experiment No. | Monomer | Free-radical initiator | Electron donor | Solvent | Temp. [° C.] | Reaction time | Mn | Mw | PDI |
| --- | --- | --- | --- | --- | --- | --- | --- | --- | --- |
| 7 | Styrene | AIBN | TTF | THF | 60 | 72 h | 14 200 | 25 400 | 1.78 |
| 8 | Styrene | AIBN | TTF | THF | 60 | 72 h | 16 300 | 29 000 | 1.77 |
| 9 | Styrene | AIBN | TTF | Toluene | 110 | 72 h | 9 200 | 15 400 | 1.67 |
| 10 | Styrene | AIBN | TTF | Toluene | 110 | 72 h | 13 800 | 25 600 | 1.85 |
| C5 | Styrene | AIBN | — | THF | 60 | 24 h | 10 600 | 28 400 | 2.68 |
| C6 | Styrene | AIBN | — | THF | 60 | 24 h | 10 800 | 28 000 | 2.59 |
| C7 | Styrene | AIBN | — | Toluene | 110 | 24 h | 16 700 | 63 500 | 3.78 |
| C8 | Styrene | AIBN | — | Toluene | 110 | 24 h | 15 500 | 55 500 | 3.56 |

Example 11

Preparing a Copolymer of MMA and Styrene

Examples 1 to 6 were repeated but employing MMA and styrene as monomers (molar ratio 1:1).

The reaction conditions and the properties of the copolymer are summarized in Table 3.

TABLE 3

| Experiment No. | Monomer | Free-radical initiator | Electron donor | Solvent | Temp. [° C.] | Reaction time | Mn | Mw | PDI |
| --- | --- | --- | --- | --- | --- | --- | --- | --- | --- |
| 11 | Styrene/MMA | AIBN | TTF | THF | 60 | 72 h | 21 100 | 32 000 | 1.51 |

TABLE 4

| Experiment No. | Monomer | Free-radical initiator | Electron donor | Solvent | Temp. [° C.] | Reaction time | Mn | Mw | PDI |
|---|---|---|---|---|---|---|---|---|---|
| 12 | Styrene | BPO | PTA | THF | 130 | 2 h | 178 600 | 300 000 | 1.68 |
| 13 | Styrene | BPO | DMAPPTA | THF | 130 | 25 h | 76 500 | 193 600 | 2.53 |
| 14 | Styrene/AN | BPO | PTA | THF | 130 | 1 h | 28 600 | 83 000 | 2.9 |
| C9 | Styrene | BPO | — | THF | 130 | 2 h | 71 200 | 192 300 | 2.7 |
| C10 | Styrene/AN | BPO | — | THF | 130 | 1 h | 2 900 | 40 000 | 14 |

Example 15

Changing the Molecular Weight With Time

Example 12 was repeated except that a smaller proportion of BPO and PTA to styrene was chosen (0.29 g of BPO, 0.18 g of PTA, 104.15 g of styrene). At the intervals shown below samples were taken, the products were precipitated from methanol and the precipitates were collected, dried under reduced pressure at 80° C. and analyzed. The results are shown in Table 5:

TABLE 5

| Time | $M_n$ | $M_w$ | PDI |
|---|---|---|---|
| 30 min | 57 600 | 144 000 | 2.5 |
| 60 min | 69 000 | 173 000 | 2.5 |
| 3 h | 90 200 | 198 000 | 2.2 |
| 5 h | 88 800 | 213 000 | 2.4 |

Table 5 shows that the molecular weight increases the longer the reaction time.

We claim:

1. A process for preparing addition polymers of vinylic monomer selected form the group consisting of vinylaromatic compounds substituted vinylaromatic compounds, $C_1$- to $C_8$-alkyl esters of acrylic or methacrylic acid unsaturated dicarboxylic acids or their derivatives, vinyl cyanides, and mixtures thereof, having a PDI of less than 2, which comprises carrying out the polymerization in the presence of free-radical initiators and of electron donors of the formula I or II

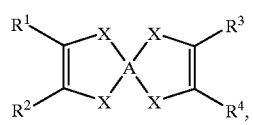
I

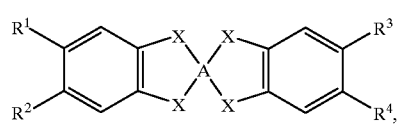
II where x is sulfur or selenium $R^1$ to $R^4$ hydrogen, $C_1$- to $C_{20}$-alkyl, $C_1$- to $C_{20}$-alkoxy or $C_6$- to $C_{18}$-aryl and A is a double bond,

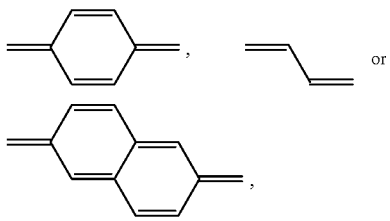

or of the formulae III to VIII

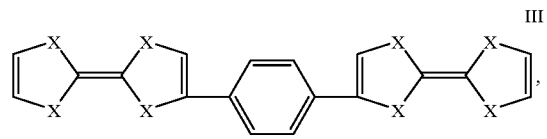
III

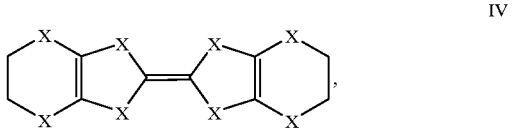
IV

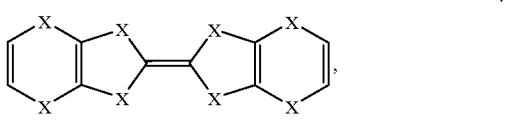
V

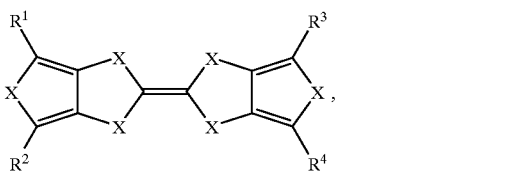
VI where

X is sulfur or selenium, $R^1$ to $R^4$ are hydrogen, $C_1$- to $C_{20}$-alkyl, $C_1$- to $C_{20}$-alkoxy or $C_6$- to $C_{18}$-aryl, or of the formula IX or X

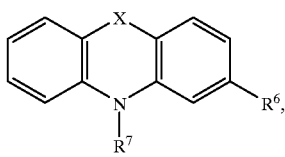
XI

-continued

XII

[Structure: phenoxazine/phenothiazine derivative with X bridging two naphthalene-fused rings and N-R¹²]

where

X is oxygen or sulfur,
and $R^6$ is hydrogen, $C_1$- to $C_5$-alkyl, —$CF_3$, halogen, —CN, —$SR^a$, —$OR^a$ or $NR^aR^b$, $R^a$ is $C_1$- to $C_{25}$-alkyl or $C_6$- to $C_{18}$-aryl, $R^b$ is hydrogen, $C_1$- to $C_{25}$-alkyl or $C_6$- to $C_{18}$-aryl, $R^7$ is hydrogen or (T)Z, T is branched or unbranched $C_1$- to $C_{25}$-alkylene, Z is —OH, —$OR^8$, —$SR^8$, —$NR^9R^{10}$ or Q $R^8$ is $C_1$- to $C_{25}$-alkyl or $C_6$–$C_{18}$-aryl, $R^9$ is hydrogen or $C_1$- to $C_{25}$-alkyl or $C_6$- to $C_{18}$-aryl, $R^{10}$ is $C_1$- to $C_{25}$-alkyl or $C_6$- to $C_{18}$-aryl, where $R^9$ and $R^{10}$, with one another and together with the nitrogen, can optionally form a $C_4$- to $C_7$-cyclo-N-aliphatic ring which can be either unsubstituted or substituted by one or more $C_1$-to $C_5$-alkyls and can contain one or more —O—, —S— or —N($R^{11}$)—, where —O—, —S— and —N($R^{11}$)— are not joined directly to one another, Q is a $C_4$- to $C_7$-cycloaliphatic radical which optionally contains one or more —O—, —S— or —N($R^{11}$)—, and where Q is in each case linked via a carbon to T and where —O—, —S— and —N($R^{11}$)—, are not joined directly to one another, $R^{11}$ is $C_1$- to $C_{10}$-alkyl, $R_{12}$ is hydrogen, $C_1$- to $C_{20}$-alkyl or $C_6$- to $C_{18}$-aryl.

2. A process as claimed in claim 1, wherein said vinylic monomers are selected from the group consisting of styrene, substituted styrene, $C_1$- to $C_4$ alkyl esters of acrylic or methacrylic acid, acrylonitrile, and mixtures thereof.

3. A process as claimed in claim 1 wherein the electron donor is a phenoxazine, phenothiazine, or phenoselazine derivative of formula XI or XII.

4. A process as claimed in claim 1, wherein the electron donor employed is tetrathiafulvalene

[Structure: tetrathiafulvalene]

5. A process as claimed in claim 1, which is carried out in an organic solvent.

6. A process as claimed in claim 1, wherein the molar ratio of electron donors to free-radical initiators is in the range from 1:1 to 3:1.

7. The process of claim 2, wherein said electron donor is a phenoxazine, phenothiazine, or phenoselazine derivative of formula XI or XII.

8. The process of claim 2, wherein said electron donor is tetrathiafulvalene

[Structure: tetrathiafulvalene]

9. A process as claimed in claim 2, which is carried out in a solvent.

10. A process as claimed in claim 2, wherein the molar ratio of electron donors to free-radical initiators is in the range from 1:1 to 3:1.

11. A process as claimed in claim 7, which is carried out in a solvent.

12. A process as claimed in claim 7, wherein the molar ratio of electron donors to free-radical initiators is in the range from 1:1 to 3:1.

13. A process as claimed in claim 8, which is carried out in a solvent.

14. A process as claimed in claim 8, wherein the molar ratio of electron donors to free-radical initiators is in the range from 1:1 to 3:1.

15. A process for preparing addition polymers of vinylic monomers selected from the group consisting of vinylaromatic compounds, substituted vinylaromatic compounds, $C_1$- to $C_8$-alkyl esters of acrylic or methacrylic acid, unsaturated dicarboxylic acids or their derivatives, vinyl cyanides, and mixtures thereof, having a PDI of less than 2, which comprises carrying out the polymerization in the presence of free-radical initiators and of electron donors of the formula I or II

I

[Structure I]

II

[Structure II]

where

X is sulfur or selenium $R^1$ to $R^4$ hydrogen, $C_1$- to $C_{20}$-alkyl, $C_1$- to $C_{20}$-alkoxy or $C_6$- to $C_{18}$-aryl and A is a double bond,

[Structures: quinodimethane, ethylene, or naphthoquinodimethane] or or of the formulae III to VI

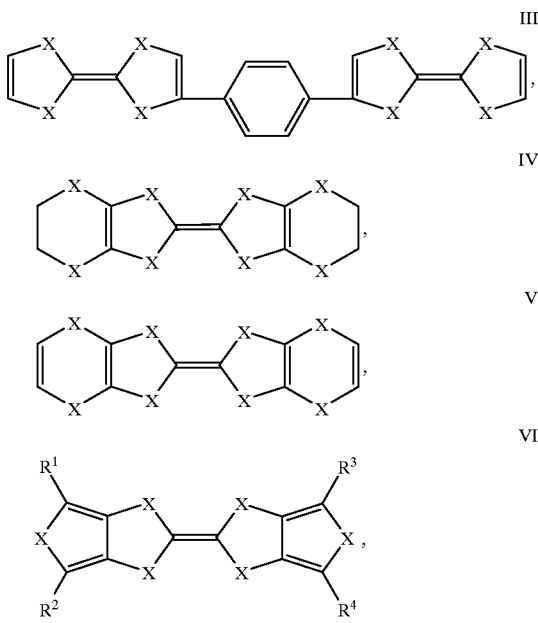

where

X is sulfur or selenium,

R¹ to R⁴ are hydrogen, $C_1$- to $C_{20}$-alkyl, $C_1$- to $C_{20}$-alkoxy or $C_6$- to $C_{18}$-aryl, or of the formula XI or XII

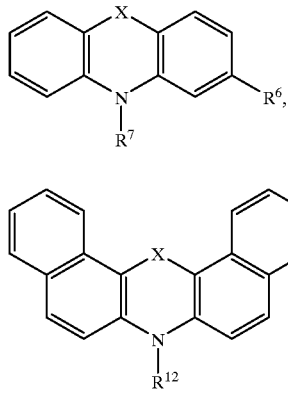

where

X is sulfur or selenium and

R⁶ is hydrogen, $C_1$- to $C_6$-alkyl, —CF₃, halogen, —CN, —SR$^a$, —OR$^a$ or NR$^a$R$^b$, R$^a$ is $C_1$- to $C_{25}$-alkyl or $G_6$- to $C_{18}$-aryl, R$^b$ is hydrogen, $C_1$- to $C_{25}$-alkyl or $C_6$- to $C_{18}$-aryl, R⁷ is hydrogen or (T)Z, T is branched or unbranched $C_1$- to $C_{25}$-alkylene, Z is —OH, —OR⁸, —SR⁸, —NR⁹R¹⁰ or Q R⁸ is $C_1$- to $C_{25}$-alkyl or $C_6$–$C_{18}$-aryl, R⁹ is hydrogen or $C_1$- to $C_{25}$-alkyl or $C_6$- to $C_{18}$-aryl, R¹⁰ is $C_1$- to $C_{25}$-alkyl or $C_6$- to $C_{18}$-aryl, where R⁹ and R¹⁰, with one another and together with the nitrogen, can optionally form a $C_4$- to $C_7$-cyclo-N-aliphatic ring which can be either unsubstituted or substituted by one or more $C_1$- to $C_5$-alkyls and can contain one or more —O—, —S— or —N(R¹¹)—, where —O—, —S— and —N(R¹¹)— are not joined directly to one another, Q is a $C_4$- to $C_7$-cycloaliphatic radical which optionally contains one or more —O—, —S— or —N(R¹¹)—, and where Q is in each case linked via a carbon to T and where —O—, —S— and —N(R¹¹)—, —O—, —S— and —N(R¹¹)— are not joined directly to one another, R¹¹ is $C_1$- to $C_{10}$-alkyl, R₁₂ is hydrogen, $C_1$- to $C_{20}$-alkyl or $C_6$- to $C_{18}$-aryl.

16. The process of claim 15, wherein said vinylic monomers are selected from the group consisting of styrene, substituted styrene, $C_1$–$C_4$-alkyl esters of acrylic or methacrylic acid, acrylonitrile, or mixtures thereof.

17. A process as claimed in claim 15, wherein the molar ratio of electron donors to free-radical initiators is in the range from 1:1 to 3:1.

18. A process as claimed in claim 15, which is carried out in a solvent.

19. A process as claimed in claim 16, which is carried out in a solvent.

20. A process as claimed in claim 16, wherein the molar ratio of electron donors to free-radical initiators is in the range from 1:1 to 3:1.

* * * * *

UNITED STATES PATENT AND TRADEMARK OFFICE
CERTIFICATE OF CORRECTION

PATENT NO. : 6,166,155
DATED : December 26, 2000
INVENTOR(S) : Koch et al.

It is certified that error appears in the above-identified patent and that said Letters Patent is hereby corrected as shown below:

Column 2,
Line 63, "initiators. the" should be -- initiators. The --.

Column 4,
Line 62, the formula number shown after the formula "X" should be -- IX --.

Column 5,
Line 2, the formula number shown after the formula "IV" should be -- X --.

Signed and Sealed this

Twenty-seventh Day of November, 2001

Attest:

NICHOLAS P. GODICI
Attesting Officer   Acting Director of the United States Patent and Trademark Office